United States Patent [19]

Koike

[11] 4,263,643

[45] Apr. 21, 1981

[54] SWITCHING REGULATOR PROVIDED WITH ERROR AMPLIFIER CIRCUIT HAVING OVERCURRENT PROTECTING FUNCTION

[75] Inventor: Tsutomu Koike, Higashimatsuyama, Japan

[73] Assignee: Toko, Inc., Tokyo, Japan

[21] Appl. No.: 70,999

[22] Filed: Aug. 30, 1979

[30] Foreign Application Priority Data

Sep. 4, 1978 [JP] Japan .............................. 53-108357

[51] Int. Cl.³ ......................................... H02M 3/335
[52] U.S. Cl. ......................................... 363/19; 363/80
[58] Field of Search .................................. 363/18–21, 363/80, 124

[56] References Cited

U.S. PATENT DOCUMENTS

| | | | |
|---|---|---|---|
| 4,013,935 | 3/1977 | Siepmann et al. ...................... | 363/19 |
| 4,021,717 | 5/1977 | Furuishi et al. ...................... | 363/19 X |
| 4,030,024 | 6/1977 | Chambers et al. ...................... | 363/19X |

*Primary Examiner*—A. D. Pellinen

*Attorney, Agent, or Firm*—Gerald J. Ferguson, Jr.; Joseph J. Baker

[57] ABSTRACT

A switching regulator in which a DC input voltage is chopped by an oscillator applied to a transformer the output of which in turn is rectified by a rectifier circuit; a DC voltage derived from the rectifier is compared with a reference voltage so that a voltage is produced which corresponds to the deviation from said reference voltage of the aforementioned DC voltage derived from the rectifier; the voltage thus produced is amplified by means of an error amplifier; a current proportional to the transformer driving current provided by the oscillator is detected by a current detector; and the output of the error amplifier is compared with the output of the current detector so that only when the former exceeds the latter, a trigger signal is applied to the oscillator, whereby the oscillation of the oscillator is changed from an ON state to an OFF state. In such a switching regulator, there is provided circuitry for limiting the operation range of the aforementioned error amplifier by the difference between a voltage proportional to said DC voltage derived from the rectifier and a voltage proportional to the input voltage.

3 Claims, 6 Drawing Figures

SWITCHING REGULATOR PROVIDED WITH ERROR AMPLIFIER CIRCUIT HAVING OVERCURRENT PROTECTING FUNCTION

The present invention relates to a switching regulator arranged to provide an output voltage which is stabilized by means of pulse-width-modulation and equipped with an over-current protecting function, wherein correction is made for dispersion of the overcurrent protecting operation starting point which tends to be caused by fluctuations of an input voltage.

It is an object of the present invention to provide a switching regulator which is so designed that correction is made for dispersion with input variations of the load current value at which the operation for overcurrent protection is started.

In summary, according to one aspect of the present invention, there is provided a switching regulator comprising an oscillator circuit for chopping a DC voltage supplied from an input power source to thereby drive a transformer; a rectifier circuit for rectifying an AC output derived from the transformer; a voltage comparator for comparing a DC output voltage available from the rectifer circuit with a reference voltage to provide a voltage corresponding to the deviation of the DC output voltage from the reference voltage; an error amplifier circuit for amplifying the output of the voltage comparator; a current detector circuit for detecting a current proportional to the transformer driving current provided by the oscillator circuit; and a control circuit adapted for comparing the output of the current detector circuit with the output of the error amplifier circuit and also adapted, only when the current detector circuit output exceeds the error amplifier circuit output, to apply to the oscillator circuit a trigger signal for changing the oscillation from ON state to OFF state, characterized in that means is provided for limiting the operation range of the error amplifier circuit by the difference between a voltage proportional to said DC output voltage and a voltage proportional to said input voltage.

Other objects, features and advantages of the present invention will become apparent from the ensuing description taken in conjunction with the accompanying drawings.

Figure 1:
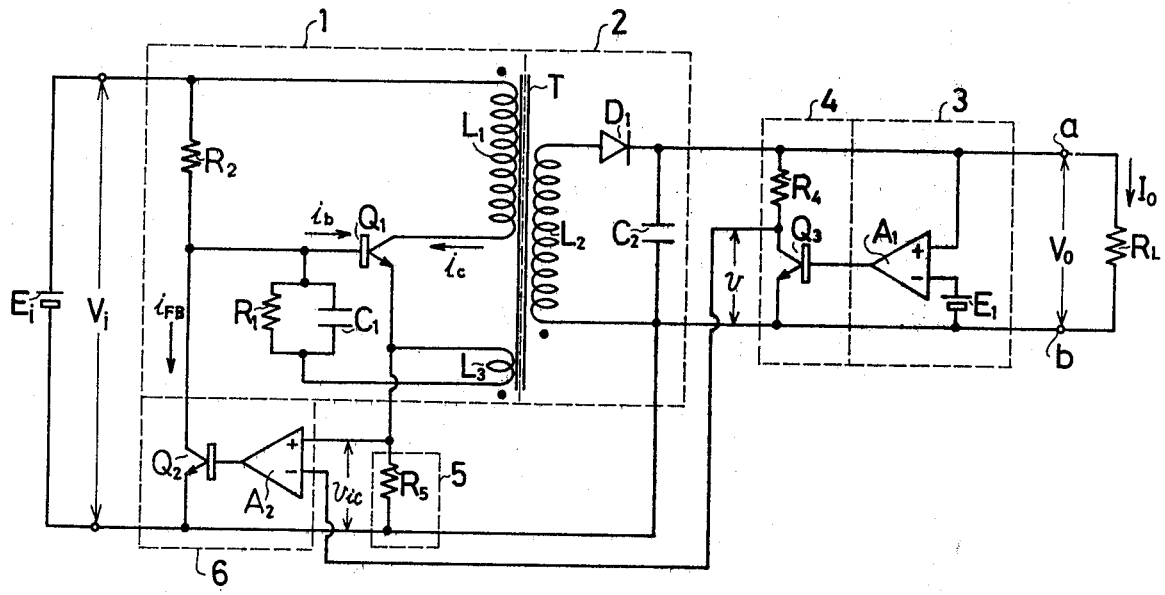
FIG. 1 is a circuit diagram showing an example of a prior switching regulator proposed by the present inventor.

In order to give better understanding of the present invention, description will first be made, with reference to FIG. 1, of the overcurrent preventing function of the switching regulator which the present inventor has proposed in U.S. patent application Ser. No. 928,441 filed July 27, 1978. As will be seen, the switching regulator shown in FIG. 1 comprises a blocking oscillator circuit 1, an output rectifier circuit 2, a voltage comparator circuit 3, an error amplifier circuit 4, a current detector circuit 5 and a control circuit 6.

With the foregoing arrangement, the output voltage $V_O$ thereof is stabilized by the use of means which is commonly referred to as ringing choke system. More specifically, when a transistor $Q_1$ is turned on, an excitation current $t \cdot V_i / L_1$ is caused to flow through a primary winding of a transformer T so that excitation energy is stored in the transformer T. When the transistor $Q_1$ is turned off, on the other hand, the excitation energy mentioned above is taken out as an output voltage $V_O$ across a secondary winding of the transformer T as given by the following expression:

$$V_O = \sqrt{\frac{R_L}{2L_1}} \cdot \frac{t_{ON}}{\sqrt{t_{ON} + t_{OFF}}} \cdot V_i \tag{1}$$

where $t_{ON}$ is the conduction time of the transistor $Q_1$, $t_{OFF}$ is the non-conduction time thereof, $L_1$ is inductance of the primary winding of the transformer T, $V_i$ is the input voltage, and $R_L$ is a load resistor connected across the output terminals of the switching regulator. The above equation is derived from the following relationships:

$$P_i = P_o \tag{2}$$

$$V_O = \sqrt{P_o \cdot R_L} \tag{3}$$

where $P_i$ is the input power, and $P_o$ is the output power.

Thus, it will be appreciated that the output voltage $V_O$ can be stabilized by controlling the conduction time $t_{ON}$ in equation (1) given above. That is, even if DC voltage $V_i$ supplied from an input power source $E_i$ is unstable, the desired stabilized output voltage $V_O$ is obtained across output terminals a and b. The operation of the above-mentioned switching regulator will now be explained with reference to FIG. 2 showing the voltage and current waveforms which occur in the respective portions of the circuit shown in FIG. 1.

FIG. 2(A) shows the waveform of the base input current $i_b$ of the transistor $Q_1$; FIG. 2(B) shows the waveform of the collector current $i_c$ of the transistor $Q_1$; FIG. 2(C) shows the waveform of the output voltage $v_{ic}$ of the current detector circuit 5, together with the waveform of the output voltage v of the error amplifier circuit 4; and FIG. 2(D) shows the waveform of the output current $i_{FB}$ of the control circuit 6.

Figure 2:
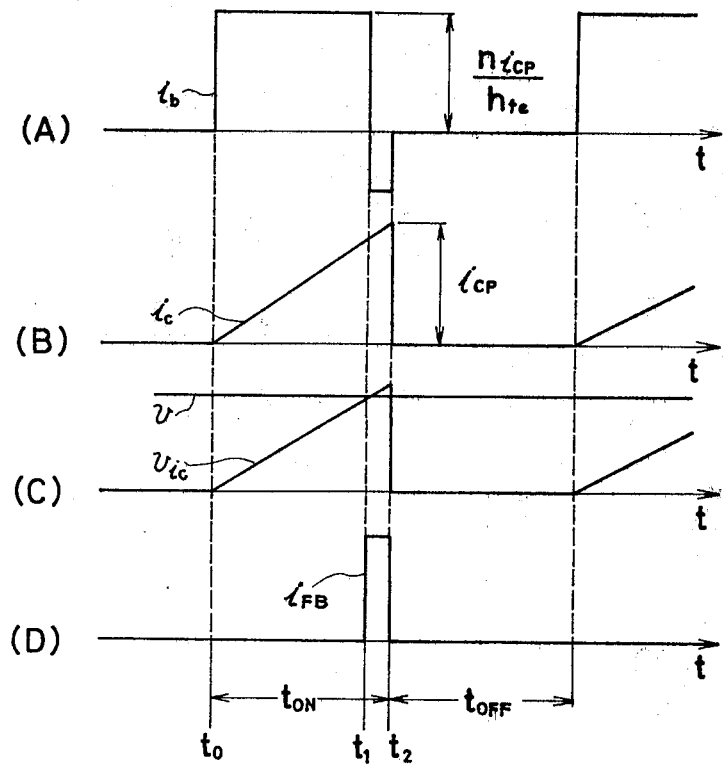
FIG. 2 is a view showing operating voltage and current waveforms which occur in the respective portions of the circuit shown in FIG. 1.
Figure 3:
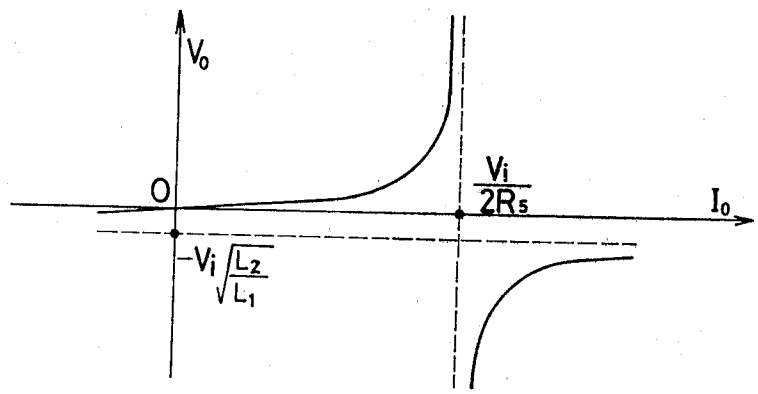
FIG. 3 is a view useful for explaining the switching regulator shown in FIG. 1.

Description will first be made of the case where the circuit shown in FIG. 1 is performing steady-state operation. When the transistor $Q_1$ of the blocking oscillator circuit 1 is turned on, the current $i_c$ is caused to flow in the primary winding of the transformer T. At this point, a voltage is induced in the secondary winding of the transformer T, but because of the fact that a diode $D_1$ in the output rectifier circuit 2 is connected in reverse polarity with respect to the voltage thus induced, most of the collector current $i_c$ of the transistor $Q_1$ is caused to constitute the excitation current $t \cdot V_i / L_1$. More specifically, when the transistor $Q_1$ is turned on at a point of time $t_0$ in FIG. 2, the collector $i_c$ is linearly increased with time. In the blocking oscillator circuit 1, the transistor $Q_1$ is turned on by imparting to the base thereof a current which is n times as high as a base current $i_{cp}/h_{fe}$ which is a minimum required for turning on the transistor $Q_1$ as in the waveform of the base $i_b$ shown in FIG. 2(A). Furthermore, the collector current $i_c$ of the transistor $Q_1$ can be prevented from saturation during conduction thereof, by means of the sufficient base current $n \cdot i_{cp}/h_{fe}$, and the collector saturation voltage thereof can be sufficiently decreased.

The voltage v which is modulated with a signal derived from the error amplifier circuit 4 in correspondence with the deviation of the output voltage $V_O$ from the reference voltage $E_1$ and which is applied to the inversion input terminal of the voltage comparator $A_2$, is controlled so as to be decreased as the output voltage $V_O$ builds up. The voltage $v_{ic}$ proportional to the collector current $i_c = t \cdot V_i / L_1$ which is provided by the current detector circuit 5 is applied to the non-inversion input terminal of the voltage comparator $A_2$. In the control circuit 6, the voltage $v_{ic}$ applied to the non-inversion input terminal of the voltage comparator $A_2$ and the voltage v applied to the inversion input terminal thereof are compared; thus, when $v_{ic}$ is higher than v, the transistor $Q_2$ is turned on, whereas when $v_{ic}$ is lower than v, the transistor $Q_2$ is turned off. By the fact that the collector current $i_c$ of the transistor $Q_1$ is made to increase linearly as mentioned above, the voltage $v_{ic}$ proportional to the collector $i_c$ is also made to increase linearly. At a point of time $t_1$ shown in FIG. 2, the relationship between $v_{ic}$ and v becomes such that $v_{ic}$ is higher than v, and as a result, the transistor $Q_2$ is turned on so that such a collector current $i_{FB}$ as shown in FIG. 2(D) is caused to flow therethrough. The collector current $i_{FB}$ acts in such a direction as to cancel out all the base current $i_b$ flowing in the transistor $Q_1$ and also quickly extinquish even the accumulated carrier remaining in the transistor $Q_1$. That is, when the output voltage $v_{ic}$ of the current detector circuit 5 exceeds the output voltage v of the error amplifier circuit 4, the transistor $Q_2$ is turned on so that the transistor $Q_1$ is quickly turned off.

With the circuit arrangement of FIG. 1, the collector saturation voltage of the transistor $Q_1$ is restricted so that the collector loss thereof is reduced, by supplying the base current $n \cdot i_{cp}/h_{fe}$ which is sufficiently greater than the base current which is required during the conduction of the transistor $Q_1$ as will be seen from the base current waveform shown in FIG. 2(A). It is possible to further reduce the collector loss of the transistor $Q_1$ which tends to occur when this transistor is in a non-conductive state, by detecting the collector current peak value $i_{cp}$ by the current detector circuit 5 and by rendering the control circuit 6 operative by the use of a signal resulting from the detection by the current detector circuit 5 so as to forcibly turn off the transistor $Q_1$. In this way, the power conversion efficiency of the switching regulator can be enhanced. In addition, the carrier accumulation time of the transistor $Q_1$ when the latter is in the non-conductive state, can be greatly shortened so that the maximum oscillation frequency can be increased, thus making it possible to secure a wide pulse modulation range for the switching regulator. With the circuit arrangement of FIG. 1, the load range can be widened at the lower load side, and yet any anomalous build-up of the output voltage $V_O$ which tends to be caused due to the frequency limit at a low load, can be prevented; as a result, the stability of the output voltage $V_O$ can be improved. The conduction time $t_{ON}$ of the transistor $Q_1$ when the switching regulator shown in FIG. 1 is under the oscillatory condition, is given by $$t_{ON} = \frac{L_1}{R_5 \cdot V_i} \cdot v \quad (4)$$

where $L_1$ is the inductance of the primary winding of the transformer T, $R_5$ is the resistance for current detection, $V_i$ is the input voltage, and v is the output of the error amplifier circuit 4. As will be noted, the aforementioned conduction time $t_{ON}$ is a function of the output v of the error amplifier circuit 4. In the blocking oscillator ciruit 1, an oscillation which is pulse-width-modulated with respect to factors such as load variations, input variations and so forth, is produced whereby the excitation energy stored in the transformer T is controlled so that the output voltage $V_O$ is stabilized.

It is particularly to be noted that the switching regulator is arranged to perform the below-mentioned overcurrent protecting function without any special overcurrent protecting circuit components incorporated therein.

As mentioned above, the circuit of FIG. 1 is designed so that according to the foregoing equation (4), the conduction time $t_{ON}$ of the oscillator circuit 1 is controlled by the output v of the error amplifier circuit which is produced in accordance with the deviation of the output voltage $V_O$ from the reference voltage $E_1$, thereby stabilizing the output voltage $V_O$ with respect to the input current $I_O$. However, because of the fact that the power supplied to the error amplifier circuit 4 is derived from the output voltage $V_O$, the operation range of the error amplifier circuit output v is restricted by the output voltage $V_O$. More specifically, because of the fact that the relationship between the error amplifier circuit output v and the output voltage $V_O$ is such that v is smaller than or equal to $V_O$, the increase in the conduction time $t_{ON}$ which increases with the output current $I_O$ is limited when such conduction time is given by the following expression:

$$t_{ON} = \frac{L_1}{R_5 \cdot V_i} \cdot V_O \quad (5)$$

Description will now be made of the relationship between the output voltage $V_O$ and the output current $I_O$ as there occurs an overcurrent, or as the output current $I_O$ is increased after the requirement as given by the equation (5) has been satisfied.

In this case, since the output voltage $V_O$ is similar to the aforementioned equation (1), the input power $P_i$ and output power $P_o$ are given by the following equations (6) and (7) respectively:

$$P_i = \frac{1}{T} \int_0^{t_{ON}} V_i \cdot \frac{V_i}{L_1} t \, dt \quad (6)$$

$$P_i = \frac{V_i^2 \, t_{ON}^2}{2 L_1 T}$$

$$P_O = \frac{1}{T} \int_0^{t_{OFF}} V_O \cdot \frac{V_O}{L_2} t \, dt \quad (7)$$

$$P_O = \frac{V_O^2 \, t_{OFF}^2}{2 L_2 T}$$

Assuming that the power conversion efficiency is 100%, then the input power $P_i$ is equal to the output power $P_o$; thus, the ratio of the conduction time $t_{ON}$ of the transistor $Q_1$ to the non-conduction time thereof is derived from the equations (6) and (7) as follows:

$$\frac{t_{ON}}{t_{OFF}} = \frac{V_O}{V_i} \cdot \sqrt{\frac{L_1}{L_2}} \quad (8)$$

Furthermore, from the equations (5) and (8), the non-conduction time $t_{OFF}$ of the transistor $Q_1$ when an overcurrent is detected, is obtained as follows:

$$t_{OFF} = \frac{\sqrt{L_1 L_2}}{R_5} \quad (9)$$

By eliminating $t_{ON}$ and $t_{OFF}$ from the equations (1), (5) and (9), the relationship between the output voltage $V_O$ and the load resistance $R_L$ when an overcurrent is detected, is obtained as follows:

$$V_O = V_i \left( \frac{R_L}{2R_5} - \sqrt{\frac{L_2}{L_1}} \right) \quad (10)$$

Further, the relationship between the output voltage $V_O$ and the output current $I_O$ is $V_O = I_O R_L$; thus, the output current $I_O$ can be written as follows:

$$I_O = V_i \left( \frac{1}{2R_5} - \frac{1}{R_L} \sqrt{\frac{L_2}{L_1}} \right) \quad (11)$$

By eliminating the load resistance $R_L$ from the equations (10) and (11), the relationship between the output voltage $V_O$ and the output current $I_O$ can be rewritten as follows:

$$V_o + V_i \sqrt{L_2/L_1} = \frac{V_i^2}{2R_5} \sqrt{L_2/L_1} \cdot \frac{1}{\frac{V_i}{2R_5} - I_O} \quad (12)$$

It will be noted that the relationship defined by the equation (12) depicts a hyperbola with asymptotes defined by the output voltage $V_O = -V_i\sqrt{L_2/L_1}$ and the output current $I_O = V_i/2R_5$ respectively. It is when the output v of the error amplifier circuit 4 is greater than the output voltage $V_O$ as mentioned above that the equation (12) holds true. When v is smaller than $V_O$, i. e., when the output current $I_O$ is not an overcurrent, the output voltage $V_O$ is controlled to be stabilized by the reference voltage of the reference voltage element $E_1$ as will be appreciated from the aforementioned equation (1). More specifically, when the output voltage $V_O$ is equal to or greater than 0 and the output voltage $I_O$ is equal to or greater than 0, the relationship between the output voltage $V_O$ and the output current $I_O$ is given by a combination of the equations (1) and (12) so that such overcurrent protecting function and so-called fold-back current falling characteristic or leftwardly falling characteristic shown in FIG. 4 can be achieved.

Figure 4:
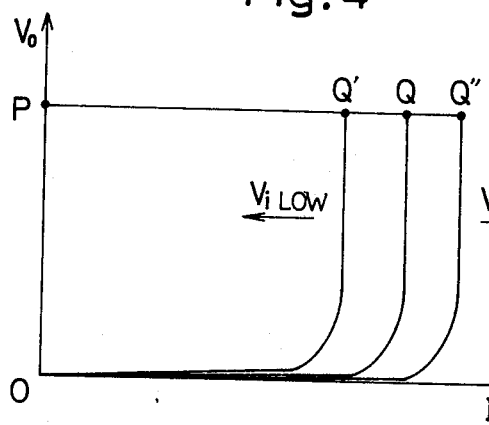
FIG. 4 is a view illustrating the relationship between the output voltage $V_O$ and the output current $I_O$ in the arrangement shown in FIG. 1.

The relationship between the output voltage $V_O$ and the output current $I_O$ as shown in FIG. 4 will next be explained briefly.

In the case where the output current $I_O$ is within the rated value range and yet the output v of the error amplifier circuit 4 is within the operation range proportional to the deviation of the reference voltage of the reference voltage of the reference voltage element $E_1$, the relationship between $V_O$ and $I_O$ turns out to be as illustrated by the P-Q line in FIG. 4, and thus the output voltage $V_O$ is stabilized according to the aforementioned equation (1). In contrast thereto, in the case where the output current $I_O$ is an overcurrent outside the rated current range and yet is limited by the voltage applied to the error amplifier circuit 4, i. e., the DC output voltage $V_O$ obtained across the output terminals a and b, the relationship between $V_O$ and $I_O$ turns out to be as shown by the Q-O curve, and thus the output current $I_O$ is restricted according to the aforementioned equation (12). With circuit arrangement shown in FIG. 1, therefore, it is possible to achieve an overcurrent protecting function and so-called fold-back current falling characteristic such as shown by the P-Q-O curve in FIG. 4.

With the circuit arrangement shown in FIG. 1, however, difficulties have been encountered in attempt to achieve a highly accurate design of the switching regulator and besides the overcurrent protecting function has not necessarily been satisfactory in that there is the tendency that the load current value at which the operation for overcurrent protection is initiated is fluctuated with variations in the input voltage such that the overcurrent protection is started at a point Q' when the input voltage $V_i$ is low whereas when the input voltage $V_i$ is high, the overcurrent protection is started at a point Q'' as shown in FIG. 4, since the aforementioned load current value is a function of the input voltage $V_i$ as will also be appreciated from the foregoing equation (12).

Accordingly, the present invention is intended to eliminate the aforementioned drawbacks of the switching regulator shown in FIG. 1, thereby providing an improved switching regulator wherein correction is made for dispersion with input fluctuations of the load current value at which the operation for overcurrent protection is initiated, thus achieving an enhanced accuracy.

Figure 5:
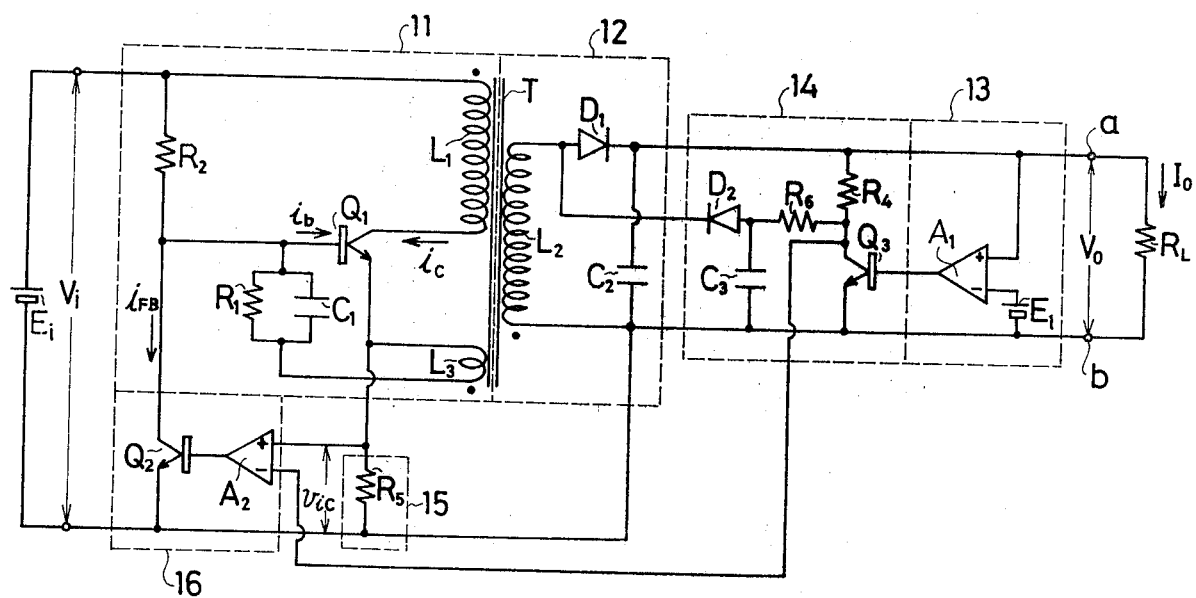
FIG. 5 is a circuit diagram showing the switching regulator according to an embodiment of the present invention.

Referring to FIG. 5, there is shown the switching regulator according to an embodiment of the present invention, which will be described below.

In this embodiment, there are provided a blocking oscillator circuit 11 comprising the primary winding $L_1$ and feedback winding $L_3$ of a transformer T, a base resistor $R_1$, a base capacitor $C_1$, a starter resistor $R_2$ and a transistor $Q_1$, the blocking oscillator circuit 11 being arranged to be externally provided with a trigger signal by which the blocking oscillator is brought into an OFF state; an output rectifier circuit 12 which includes a first rectifier circuit comprising the secondary winding $L_2$ of the transformer T, a a diode $D_1$, a smoothing capacitor $C_2$ and a second rectifier circuit comprising a diode $D_2$ adapted to rectify on ON-ON output proportional to the input voltage and a smoothing capacitor $C_3$; a voltage comparator circuit 13 comprising a reference voltage element $E_1$ and a voltage comparator $A_1$; an error amplifier circuit 14 comprising resistors $R_4$ and $R_6$ and a transistor $Q_3$; a current detecting circuit 15 comprising a current detecting element such for example as a resistor $R_5$, current transformer or the like; and a control circuit 16 comprising a voltage comparator $A_2$ and a transistor $Q_2$, the control circuit 16 being arranged to impart to the blocking oscillator circuit 11 a trigger signal by which the blocking oscillator circuit 11 is brought into an OFF state.

As will be seen, the operation of the major circuit portion of the arrangement described just above is similar to that of the arrangement shown in FIG. 1. Therefore, explanation of such operation will be omitted, and only the overcurrent protecting function will be described below.

Figure 6:
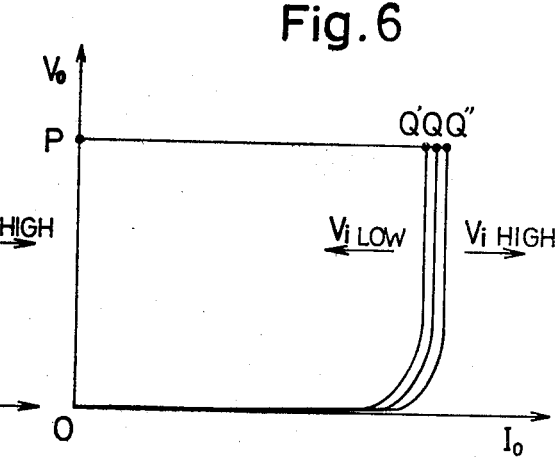
FIG. 6 is a view illustrating the relationship between the output voltage $V_O$ and the output current $I_O$ in the arrangement shown in FIG. 5.

In the embodiment shown in FIG. 5, the power source for the error amplifier circuit 14 is derived from the difference between a voltage proportional to a DC output voltage obtained across a load resistor $R_L$ and a voltage proportional to an input voltage $V_i$, and the operation range of the output v of this error amplifier circuit 14 is given by $$v \leq \frac{R_6}{R_4 + R_6} V_O - \frac{R_4}{R_4 + R_6} k V_i \qquad (13)$$

where k is a constant for proportion between the input voltage and the rectified output voltage, which is defined by the diode $D_2$ and capacitor $C_3$. Referring now to FIG. 6, there is illustrated the overcurrent protection characteristic of the circuit arrangement shown in FIG. 5, from which it will be seen that in order that the load current value at which the operation for overcurrent protection may be kept constant, the power at the operation starting point Q should also be constant. Thus, the circuit shown in FIG. 5 should be so designed as to make not only the transformer driving current but also the transformer driving power constant at the side of the primary winding of the transformer T. With the $I_O$–$I_O$ characteristic shown in FIG. 6, for a higher input voltage $V_i$, it is possible to shift the over-current protecting operation starting point from Q to Q" by decreasing the upper limit value of the operation range of the error amplifier circuit 14 by a quantity corresponding to an increment in the input voltage $V_i$, whereas for a lower input voltage $V_i$, it is possible to shift the aforementioned starting point from Q to Q'. In this way, the load current value at which the operation for overcurrent protection is initiated, can be kept substantially constant irrespective of input fluctuations. The circuit arrangement shown in FIG. 5 is arranged so that the upper limit value of the operation range of the error amplifier circuit 14 decreases with an increase in the input voltage $V_i$ as will be noted from the equation (13); thus, by optimally choosing the value for the proportion constant k and resistors $R_4$ and $R_6$ in the equation (13), it is possible to correct fluctuations of overcurrent protecting operation starting point which have been caused in the conventional circuit arrangement.

Though, in the foregoing embodiment, the present invention was applied to a self-excitation type switching regulator employing a blocking oscillator, it is to be understood that the present invention is also applicable to a separate-excitation type switching regulator, whereby similar effects to those mentioned above can be produced.

As will be appreciated from the above explanation, according to the present invention, there is provided an improved switching regulator which irrespective of the oscillation system employed therein, exhibits an excellent power conversion efficiency and is able to positively perform the overcurrent protecting function without any special overcurrent protecting circuit components incorporated therein.

While the present invention has been described with respect to a specific embodiment thereof, it is to be understood that the present invention is not limited thereto in any way but covers any and all changes and modifications which will become possible within the scope of the appended claims.

What is claimed is:

1. A switching regulator comprising an oscillator circuit for chopping a DC voltage supplied from a source of input voltage to thereby drive a transformer; a first rectifier circuit for rectifying an AC output voltage derived from the transformer; a voltage comparator for comparing a DC output voltage available from the rectifier circuit with a reference voltage to provide a voltage corresponding to the deviation of the DC output voltage from the reference voltage; an error amplifier circuit for amplifying the output of the voltage comparator; a current detector circuit for detecting a current proportional to the transformer driving current provided by the oscillator circuit; and a control circuit adapted for comparing the output of the current detector circuit with the output of the error amplifier circuit and also adapted, only when the current detector circuit output exceeds the error amplifier circuit output, to apply to the oscillator circuit a trigger signal for changing the oscillation of said oscillator circuit from an ON state to an OFF state, the improvement where a power supply for said error amplifier comprises a second rectifier circuit for rectifying said output of the transformer when the oscillator is in the ON state to obtain a further DC voltage and means for so applying said DC output voltage and said further DC voltage to the error amplifier circuit that the operation range of the error amplifier circuit is limited by the difference between a voltage proportional to said DC output voltage and a voltage proportional to said input voltage.

2. A switching regulator as in claim 1 where said first and second rectifier circuits respectively include first and second diodes and where the polarity of said first diode with respect to the transformer is different than that of the second diode with respect to the transformer.

3. A switching circuit as in claims 2 or 3 including a voltage divider circuit connected to the error amplifier where said first and second rectifier circuits are connected to the voltage divider.

* * * * *